United States Patent
Koseki et al.

(10) Patent No.: US 9,972,445 B2
(45) Date of Patent: May 15, 2018

(54) ELECTROLYTIC CAPACITOR AND METHOD OF MANUFACTURING THE SAME

(71) Applicant: NIPPON CHEMI-CON CORPORATION, Shinagawa-ku, Tokyo (JP)

(72) Inventors: Kazuya Koseki, Kawasaki (JP); Kouichi Kuroda, Sukagawa (JP); Masao Sakakura, Sukagawa (JP); Tomohiro Matsuzaki, Sukagawa (JP); Takayuki Nakaji, Osaki (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 0 days. days.

(21) Appl. No.: 14/744,932

(22) Filed: Jun. 19, 2015

(65) Prior Publication Data
US 2015/0287540 A1    Oct. 8, 2015

Related U.S. Application Data

(63) Continuation of application No. PCT/JP2013/083567, filed on Dec. 16, 2013.

(30) Foreign Application Priority Data

Dec. 21, 2012    (JP) .................. 2012-280278

(51) Int. Cl.
| H01G 9/028 | (2006.01) |
| H01G 9/145 | (2006.01) |
| H01G 9/035 | (2006.01) |
| H01G 9/00  | (2006.01) |
| H01G 9/042 | (2006.01) |
| H01G 9/15  | (2006.01) |

(52) U.S. Cl.
CPC .......... *H01G 9/145* (2013.01); *H01G 9/0036* (2013.01); *H01G 9/028* (2013.01); *H01G 9/035* (2013.01); *H01G 9/042* (2013.01); *H01G 9/151* (2013.01)

(58) Field of Classification Search
CPC .......... H01G 9/004; H01G 9/035; H01G 9/15; H01G 9/00; H01G 9/042; H01G 9/028; H01G 9/2009
See application file for complete search history.

(56) References Cited

U.S. PATENT DOCUMENTS

| 4,910,645 A | 3/1990 | Jonas et al. |
| 6,307,735 B1 | 10/2001 | Saito et al. |
| 6,962,612 B1 | 11/2005 | Saito et al. |
| 8,837,114 B2 * | 9/2014 | Kamiyama .......... H01G 9/0036 29/25.03 |
| RE45,994 E | 5/2016 | Saito et al. |
| 2004/0223270 A1 * | 11/2004 | Nitta .................. H01G 9/02 361/15 |
| 2005/0237696 A1 | 10/2005 | Takeda et al. |
| 2008/0002334 A1 | 1/2008 | Kakuma et al. |
| 2008/0316679 A1 * | 12/2008 | Sugihara .............. H01G 9/035 361/504 |
| 2009/0144954 A1 | 6/2009 | Furusawa et al. |
| 2010/0053847 A1 | 3/2010 | Tani et al. |
| 2013/0070393 A1 | 3/2013 | Kamiyama et al. |
| 2014/0009869 A1 | 1/2014 | Aoyama et al. |

FOREIGN PATENT DOCUMENTS

| CN | 1225495 A | 8/1999 |
| CN | 102834881 A | 12/2012 |
| JP | H02-15611 A | 1/1990 |
| JP | 9-82575 A | 3/1997 |
| JP | 2007-235105 A | 9/2007 |
| WO | WO 2011/121995 A1 | 10/2011 |
| WO | WO 2012/140881 A1 | 10/2012 |

OTHER PUBLICATIONS

International Search Report from International Patent Application No. PCT/JP2013/083567, dated Mar. 4, 2014.
Office Action dated Jan. 25, 2017 in Chinese Patent Application No. 201380066849.2.
Extended European search report for European Patent Application No. 13863949.7, dated Aug. 2, 2016.
Extended European Search Report dated Mar. 26, 2018, in European Patent Application No. 17208295.0.

* cited by examiner

*Primary Examiner* — Nguyen Ha
(74) *Attorney, Agent, or Firm* — Shapiro, Gabor and Rosenberger, PLLC

(57) ABSTRACT

Provided are an electrolytic capacitor with high withstand voltage capable of preventing deterioration of withstand voltage characteristics caused by lead-free reflow or the like and improving ESR characteristics, and a manufacturing method thereof. The electrolytic capacitor is obtained by impregnating a capacitor element in which an anode electrode foil and a cathode electrode foil are wound with a separator interposed, with a dispersion containing: particles of a conductive polymer; sorbitol or sorbitol and polyalcohol; and a solvent so as to form a solid electrolyte layer containing 60 to 92 wt % of the sorbitol or the sorbitol and polyalcohol, and by filling an electrolytic solution containing ethylene glycol in a gap portion in the capacitor element on which the solid electrolyte layer is formed.

14 Claims, No Drawings

ELECTROLYTIC CAPACITOR AND METHOD OF MANUFACTURING THE SAME

CROSS-REFERENCE TO RELATED APPLICATION(S)

This application is a Continuation of PCT Application No. PCT/JP2013/083567, filed on Dec. 16, 2013, and claims priority to Japanese Patent Application No. 2012-280278, filed on Dec. 21, 2012, the entire contents of both of which are incorporated herein by reference.

TECHNICAL FIELD

The present invention relates to an electrolytic capacitor and a manufacturing method thereof, and particularly relates to an electrolytic capacitor having favorable ESR characteristics and withstand voltage characteristics and a manufacturing method thereof.

BACKGROUND ART

Electrolytic capacitors using metal having a valve action such as tantalum or aluminum are widely used in general since a large capacity can be obtained with a small size by forming a valve-action metal as an opposite electrode on an anode side into a shape of a sintered body, an etching foil or the like so as to enlarge a surface of a dielectric. Particularly, solid electrolytic capacitors using a solid electrolyte as its electrolyte is indispensable for size reduction, functional improvement and cost reduction of electronic equipment since they have properties such as ease to be made into a chip, suitability for surface mounting and the like in addition to the properties such as a small size, large-capacity and low-equivalent series resistance.

For small-sized large-capacity applications, this type of solid electrolytic capacitors generally has a structure in which a capacitor element is formed by winding an anode foil and a cathode foil composed of a valve-action metal such as aluminum with a separator interposed therebetween, a solid electrolyte layer is formed in this capacitor element, and the capacitor element is accommodated in a case made of metal such as aluminum or a case made of a synthetic resin and sealed. Note that aluminum as well as tantalum, niobium, titanium and the like are used as an anode material, and the same type of metal as the anode material is used as a cathode material.

Moreover, as a solid electrolyte used for the solid electrolytic capacitor, manganese dioxide and a 7,7,8,8-tetracyanoquinodimethane (TCNQ) complex are known. In recent years, a technology paying attention to a conductive polymer such as polyethylenedioxythiophene (hereinafter referred to as PEDOT) which has a gentle reaction speed and excellent adhesion between an anode electrode and an oxide coating layer is present (see JP H02-15611 A).

A solid electrolytic capacitor of a type in which a solid electrolyte layer composed of a conductive polymer such as PEDOT is formed in such a winding-type capacitor element is fabricated as follows. First, a surface of the anode foil made of a valve-action metal such as aluminum is roughened by electrochemical etching processing in an aqueous chloride solution so as to form a large number of etching pits. Then, a voltage is applied in an aqueous solution such as ammonium borate so as to form an oxide coating layer which is as a dielectric (chemical conversion). Similarly to the anode foil, the cathode foil is also made of a valve-action metal such as aluminum, but only etching processing is applied to the surface thereof.

The anode foil on which the oxide coating layer is formed on the surface and the cathode foil in which only the etching pits are formed are wound with a separator interposed therebetween so as to form a capacitor element. Subsequently, a polymerizable monomer such as 3,4-ethylenedioxythiophene (hereinafter referred to as EDOT) and an oxidizer solution are discharged to the capacitor element after restoration and formation, respectively, or the capacitor element is immersed in a mixed solution of the both so as to promote polymerization reaction in the capacitor element and generate the solid electrolyte layer composed of a conductive polymer such as PEDOT. After that, this capacitor element is accommodated in an exterior case having a bottom and cylindrical shape so as to fabricate the solid electrolytic capacitor.

the above-described solid electrolytic capacitor has been recently used as in-vehicle equipment or for a general power supply circuit and high withstand voltages of approximately 35V or 63V has been in demand. In order to use the capacitor in such applications, a solid electrolytic capacitor satisfying required items such as heat stability at a high temperature, charging/discharging performances at a low temperature, further ESR reduction and the like is in demand.

Moreover, a lead-free solder having a high melting point has been used recently in view of an environmental problem, and a solder reflow temperature has been further rising from 200 to 220° C. to 230 to 270° C. If reflow-soldering at such a high temperature is performed, a withstand voltage is lowered probably due to heat deterioration or crystallization of the electrolyte layer. Note that, such a problem has also occurred not only in use of EDOT as a polymerizable monomer but in use of other thiophene derivatives, pyrrole, aniline and the like.

The present invention was proposed in order to solve the above-described problems and its object is to provide an electrolytic capacitor having a long life at a high temperature with reduced ESR while charging/discharging performances at a low temperature is ensured, and a manufacturing method thereof.

Moreover, another object of the present invention is to provide an electrolytic capacitor with high withstand voltage capable of preventing deterioration of withstand voltage characteristics caused by lead-free reflow or the like, and a manufacturing method thereof.

SUMMARY

The inventors have reached the following conclusion as the result of various examinations in order to solve the above-described problems.

Usually, in the capacitor element after the conductive polymer is formed, monomers not involved in the polymerization reaction, oxidizers and other reaction residues remain in addition to the conductive polymer. The withstand voltages of these substances other than the conductive polymer are lower than the withstand voltage of the conductive polymer, and thus it is considered that these substances lower the withstand voltage of the electrolytic capacitor. Thus, the inventors found that, by forming an electrolyte layer containing the conductive polymer by impregnating the capacitor element with a dispersion in which a predetermined conductive polymer compound including particles of the conductive polymer and at least sorbitol is dispersed in a solvent and by filling it with an electrolytic solution containing ethylene glycol, these reaction residues can be prevented from being mixed in, and furthermore, as the result of examination to prevent deterioration of the withstand voltage characteristics caused by lead-free reflow, they have completed the present invention.

That is, the electrolytic capacitor of the present invention is an electrolytic capacitor that comprises: a capacitor element including an anode electrode foil and a cathode electrode foil that are wound with a separator interposed therebetween; a solid electrolyte layer formed on the capacitor element and composed of a conductive polymer compound dispersion containing particles of a conductive polymer and sorbitol or sorbitol and polyalcohol the solid electrolyte layer containing 60 to 92 wt % of the sorbitol or the sorbitol and polyalcohol; and an electrolytic solution containing ethylene glycol and filled in a gap portion in the capacitor element on which the solid electrolyte layer is formed.

Moreover, a method for manufacturing an electrolytic capacitor of the present invention includes: an impregnation process impregnating a conductive polymer compound dispersion containing particles of a conductive polymer, sorbitol or sorbitol and polyalcohol and a solvent with a capacitor element including an anode electrode foil and a cathode electrode foil are wound with a separator interposed therebetween; a solid electrolyte formation process forming a solid electrolyte layer containing 60 to 92 wt % of the sorbitol or the sorbitol and polyalcohol in the capacitor element by drying the capacitor element after the impregnation process; and an electrolytic solution filling process filling an electrolytic solution containing ethylene glycol in a gap portion in the capacitor element on which the solid electrolyte layer is formed.

According to the present invention, an electrolytic capacitor which has low ESR and a long life even at a high temperature while charging/discharging performances at a low temperature is ensured can be provided. Moreover, according to the present invention, deterioration of withstand voltage characteristics caused by lead-free reflow or the like can be prevented.

DETAILED DESCRIPTION

The present invention will be described below in more detail by disclosing a typical manufacturing procedure for manufacturing an electrolytic capacitor according to the present invention.

(Manufacturing Method of Electrolytic Capacitor)

An example of a manufacturing method of an electrolytic capacitor according to the present invention is as follows. That is, a capacitor element is formed by winding an anode foil and a cathode foil, on which oxide coating layers are formed on surfaces thereof, with a separator interposed therebetween (element formation process). Note that restoration and formation may be applied to the capacitor element as necessary. Subsequently, this capacitor element is impregnated with a conductive polymer compound dispersion containing particles of a conductive polymer, (further including a dopant agent as necessary), sorbitol or sorbitol and polyalcohol, and a solvent (impregnation process). a solid electrolyte layer containing the conductive polymer and sorbitol or sorbitol and polyalcohol is formed by drying the capacitor element (solid electrolyte formation process). After that, this capacitor element is immersed in a predetermined electrolytic solution so as to fill a gap portion in the capacitor element with this electrolytic solution (electrolytic solution filling process). Then, this capacitor element is inserted into an exterior case, sealing rubber is attached to an opening end and caulking is performed for sealing and then, aging is applied so as to form an electrolytic capacitor (sealing process).

(Element Formation Process)

As the anode foil, an etching foil obtained by applying etching processing to a flat-plate shaped metal foil (a valve-action metal foil such as aluminum, for example) and further forming a dielectric oxide coating by chemical conversion can be used. As a cathode foil, an etching foil obtained by applying etching processing to a flat-plate shaped metal foil similarly to the anode foil and by forming a thinner dielectric oxide coating (approximately 1 to 10V) by chemical conversion as necessary. In the anode foil and the cathode foil, fine holes (etching pits) are formed by AC etching of an aluminum foil of 100 μm, for example, and then, it is subjected to chemical conversion in an aqueous solution of phosphoric acid or the like so as to form dielectric oxide coating on the surface.

To the anode foil and the cathode foil, an electrode extracting part is connected, respectively, and they are wound with a separator interposed therebetween so as to form the capacitor element. The separator includes a nonwoven fabric separator mainly made of a synthetic fiber, a separator mainly made of a cellulose fiber and the like. The synthetic fiber includes: polyester fibers such as polyethylene terephthalate, polybutylene terephthalate, polyethylene naphthalate and derivatives thereof; vinilon fibers; polyamide fibers such as aliphatic polyamide, aromatic polyamide, semi-aromatic polyamide and wholly aromatic polyamide; polyimide fibers; polyethylene fibers; polypropylene fibers; trimethylpentene fibers; polyphenylene sulfide fibers; acrylic fibers; aramid fibers; and the like. The cellulose fiber includes craft, Manila hemp, esparto, solvent spun cellulose fiber, cotton fiber and the like. Moreover, a mixture of a synthetic fiber and a cellulose fiber can be used.

The capacitor element formed as above is subjected to predetermined restoration and formation. As a chemical conversion liquid of restoration and formation, chemical conversion liquids of a phosphoric acid such as ammonium dihydrogen phosphate and diammonium hydrogen phosphate, chemical conversion liquids of a boric acid such as ammonium borate, and chemical conversion liquids of an adipic acid such as adipic acid ammonium can be used, but ammonium dihydrogen phosphate is preferable among them. Moreover, immersion time is preferably 5 to 120 minutes.

(Conductive Polymer Compound Dispersion)

As a conductive polymer compound dispersion, those obtained by dissolving a mixture of particles of a conductive polymer compound composed of poly-(3,4-ethylenedioxythiophene) (hereinafter referred to as PEDOT) and a solid content of a dopant composed of polystyrene sulfonate in water as a solvent is preferably used, for example. Moreover, concentration of the conductive polymer compound can be 1 to 10% with respect to an aqueous solution. Note that the solvent of the dispersion liquid of the conductive polymer compound may be those other than water as long as they are soluble of the conductive polymer compound. The above-described particles here include primary particles of the conductive polymer, an aggregate (secondary particles) in which the conductive polymer compound and the dopant aggregate together and powders thereof.

Specifically, as the conductive polymer compound contained in the conductive polymer compound dispersion, a mixture of the particles of thiophene or its derivative and a solid content of the dopant composed of polymer sulfonic acid is preferable. The conductive polymer compound dispersion is obtained by oxidative polymerizing thiophene, which is a polymerizable monomer, or its derivatives in water or an aqueous liquid in presence of polymer sulfonic acid which serves a dopant. The thiophene derivatives in above-mentioned "thiophene, which is a polymerizable monomer, or its derivatives" include, for example, 3,4-ethylene dioxythiophene, 3-alkylthiophene, 3-alkoxythiophene, 3-alkyl-4-alkcxythiophene, 3,4-alkylthiophene, 3,4-alkoxythiophene and the like. The carbon number of its alkyl group or alkoxy group is suitably 1 to 16, and 3,4-ethylene-dioxythiophene is particularly preferable. Not limited to thiophene, but pyrrole or its derivatives may be also used. Particularly preferable conductive polymers obtained from these polymerizable monomers include polythiophene, polyethylenedioxythiophene, and polypyrrole. As a polymer sulfonic acid which is as a dopant, polystyrene sulfonic sulfone, para-toluenesulfonic acid and the like are preferably used.

(Sorbitol, Polyalcohol)

This conductive polymer compound dispersion further contains sorbitol or sorbitol and polyalcohol. Since sorbitol is contained in the obtained solid electrolyte layer, initial ESR characteristics are improved, and withstand voltage is also improved. The polyalcohol which may be contained with sorbitol includes ethylene glycol, diethylene glycol, triethylene glycol, polyoxyethylene glycol, glycerin, xylitol, erythritol, mannitol, dipentaerythritol and pentaerythritol. Here, in any polyalcohol, polyalcohol with a boiling point of 180° C. or more is preferable. This is because the above-described polyalcohol hardly scatters in the drying process of the conductive polymer compound dispersion and can be made to remain in the solid electrolyte layer. In the above-described polyalcohol, ethylene glycol capable of reducing the ESR characteristics is particularly preferable.

Note that, in order to improve impregnating ability and conductivity of the conductive polymer compound dispersion, various additives (silane coupling agent, polyvinyl alcohol and the like, for example) may be added to the conductive polymer compound dispersion, or neutralization may be performed by adding cation.

(Impregnation Process of Conductive Polymer Compound Dispersion)

Time for impregnating the capacitor element with the conductive polymer compound dispersion is determined by a size of the capacitor element, and 5 seconds or more is preferable for a capacitor element of approximately φ5×3 L or 10 seconds or more for a capacitor element of approximately φ9×5 L, and impregnation for at least 5 seconds is required. Note that impregnation for a long time does not affect properties. Moreover, maintenance in a reduced pressure state is preferable after such impregnation. This is considered to be caused by reduction of a residual amount of a volatile solvent.

(Solid Electrolyte Formation Process)

After the capacitor element is impregnated with the conductive polymer compound dispersion, the capacitor element is dried at a predetermined temperature. The drying temperature is preferably 100 to 160° C. for 0.5 to 3 hours. By going through this drying process, the solid electrolyte layer containing a conductive polymer, sorbitol or sorbitol and polyalcohol is formed on the oxide coating layer in the capacitor element or particularly in the etching pit of the etching foil. Note that the impregnation process and the drying process of the conductive polymer compound dispersion may be performed plural times as necessary.

Here, by impregnating the capacitor element with the conductive polymer compound dispersion and by going through the drying process, the solid electrolyte layer containing the conductive polymer is formed in the capacitor element. However, the conductive polymer, the dopant, sorbitol or sorbitol and polyalcohol contained in the conductive polymer compound dispersion and other additives added as necessary remain in this solid electrolyte layer. Contents of sorbitol or sorbitol and polyalcohol contained in the solid electrolyte layer are preferably 60 to 92 wt %. With the contents of sorbitol or sorbitol and polyalcohol within this range, conductivity of the conductive polymer compound is improved by affinity with ethylene glycol contained in the electrolytic solution which will be described later, and favorable coating state on the oxide coating layer in the etching pit, that is, stability of the conductive polymer compound can be obtained, whereby ESR characteristics and withstand voltage characteristics are improved. Here, if the content of sorbitol or sorbitol and polyalcohol is less than 60 wt %, it is insufficient, and an effect of improvement of the ESR characteristics and withstand voltage characteristics is small. On the other hand, if the content exceeds 92 wt %, the conductive polymer compound is not sufficient, conductivity is lowered by alcohols entering between particles of the conductive polymer and between the electrode foil and the conductive polymer particles, and it is considered that the ESR characteristics are deteriorate as product characteristics.

(Electrolytic Solution Filling Process)

An electrolytic solution for an electrolytic capacitor can be used as an electrolytic solution to be filled in the capacitor element after the solid electrolyte layer containing the conductive polymer compound and sorbitol or sorbitol and polyalcohol is formed in the capacitor element. Examples of a solvent used for the electrolytic solution include γ-butyrolactone, ethylene glycol, sulfolane, dimethylfolmamide, water, a mixed solvent thereof and the like, but a solvent with a boiling point of 120° C. or more which is a life test temperature is preferably used. Particularly, if ethylene glycol is used, initial ESR characteristics and withstand voltage characteristics are improved.

That is, when an ethylene glycol solvent is used, as is obvious from examples which will be described later, it was found that ESR is lowered and the withstand voltage characteristics are improved as compared with the case in which a solvent not containing ethylene glycol is used. That is because, since ethylene glycol has an effect of promoting extension of a polymer chain of the conductive polymer, it is considered that conductivity is improved and ESR is lowered. Moreover, affinity with the conductive polymer, sorbitol, and polyalcohol contained in the solid electrolyte layer is favorable, and the conductive polymer can be made stable and can be made to exist even in a depth of the etching pit, whereby the withstand voltage characteristics are considered to be improved. Moreover, the content of ethylene glycol in the electrolytic solution is preferably 10 wt % or more with respect to the solvent.

Furthermore, at least one type of solvent selected from lactones such as γ-butyrolactone, sulfolane, 3-methyl sulfolane and 2,4-dimethyl sulfolane may be additionally used as the solvent containing ethylene glycol. Since lactones improve the ESR characteristics at a low temperature and the sulfolane solvents have high boiling points, transpiration of the electrolytic solution is suppressed, and high-temperature characteristics are improved.

As the electrolytic solution, a solution consisting of the above-described solvent and a solute, which is ammonium salt, quaternary ammonium salt, quaternized amidinium salt amine salt or the like of at least one type of organic acids, inorganic acids as well as composite compounds of organic acids and inorganic acids can be cited. The above-mentioned organic acids include: carbonic acids such as phthalic acid, isophthalic acid, terephthalic acid, maleic acid, adipic acid, benzoic acid, toluic acid, enanthic acid, malonic acid, 1,6-decanedicarboxylic acid, 1,7-octanoic dicarboxylic acid and azelaic acid; and phenols. Moreover, the inorganic acids include boric acid, phosphoric acid, phosphorous acid, hypophosphorous acid, ester phosphate, carbonic acid, silicate and the like. The composite compounds of organic acids and inorganic acids include borodisalicylic acid, borodioxalic acid, borodiglycollic acid and the like.

Moreover, the above-described salts of at least one type of organic acids, inorganic acids as well as composite compounds of organic acids and inorganic acids include ammonium salt, quaternary ammonium salt, quaternized amidinium salt, amine salt and the like. A quaternary ammonium ion of the quaternary ammonium salt includes tetramethylammonium, triethylmethyl ammonium, tetraethylammonium and the like. A quaternized amidinium includes ethyldimethylimidazolinium, tetramethylimidazolinium and the like. An amine of the amine salt includes primary amine, secondary amine, tertiary amine and the like. The primary amine includes methylamine, ethylamine, propylamine and the like, the secondary amine includes dimethylamine, diethylamine, ethylmethylamine, dibutylamine and the like, and the tertiary amine includes trimethylamine, triethylamine, tributylamine, ethyldiisopropylamine and the like.

Furthermore, if a salt of borodisalicylic acid is used as the solute of the electrolytic solution, the ESR characteristics after a low-temperature charging/discharging test at −40° C. are improved.

Moreover, an additive of the electrolytic solution includes polyoxyethylene glycol, complex compound of boric acid and polysaccharides (mannitol, sorbitol or the like), complex compound of boric acid and polyalcohol, nitro compound (o-nitrobenzoic acid, m-nitrobenzoic acid, p-nitrobenzoic acid, o-nitrophenol, m-nitrophenol, p-nitrophenol or the like), ester phosphate and the like.

Furthermore, the additive of the electrolytic solution includes sorbitol. By having the electrolytic solution contain sorbitol, withstand voltage drop rate after reflow is largely improved because of an interaction with sorbitol contained in the solid electrolyte. This is considered that, since sorbitol contained in the solid electrolyte is no longer eluted easily into the electrolytic solution by having the electrolytic solution contain sorbitol, a state in which the conductive polymer compound is favorably coated with the surface of the oxide coating layer in the etching pit can be maintained by sorbitol, and deterioration of withstand voltage characteristics can be suppressed. A content of sorbitol in the electrolytic solution is preferably 1 to 10 wt % with respect to the solvent in the electrolytic solution.

(Filling Condition of Electrolytic Solution)

When the electrolytic solution as above is to be filled in the capacitor element, a filling amount is arbitrary as long as the electrolytic solution can be filled in a gap portion in the capacitor element but the filling amount of 3 to 100% of the gap portion in the capacitor element is preferable.

(Sealing Process)

The capacitor element is inserted together with the electrolytic solution into the exterior case, sealing rubber is attached to an opening end and caulking is performed for sealing and then, aging is applied so as to form an electrolytic capacitor. Moreover, other than using the exterior case, an electrolytic capacitor can be fabricated by coating an exterior of the capacitor element with an insulating resin such as an epoxy resin and by applying aging.

(Action, Effect)

After the solid electrolyte layer containing sorbitol or sorbitol and polyalcohol is formed in the capacitor element as above, this capacitor element is immersed in the electrolytic solution containing ethylene glycol to fill the gap portion in the capacitor element with this electrolytic solution so that deterioration of the withstand voltage characteristics by lead-free reflow can be prevented and the ESR characteristics can be improved.

Examples

Subsequently, the present invention will be described in more detail on the basis of examples manufactured as above and comparative examples.

First, an electrode extracting part was connected to an anode foil subjected to etching and having an oxide coating layer formed on its surface and a cathode foil subjected to etching and having an oxide coating of 5V formed on its surface, the both electrode foils were wound with a separator mainly made of a cellulose fiber interposed so as to form a capacitor element having an element shape of 6.3φ×6.1 L. Then, this capacitor element was immersed in an ammonium dihydrogen phosphate aqueous solution for 40 minutes and subjected to restoration and formation. After that, it was immersed in a conductive polymer compound dispersion which is an aqueous solution containing particulates of PEDOT, polystyrene sulfonate, sorbitol or sorbitol and polyalcohol, the capacitor element was pulled up, and dried at approximately 150° C. Furthermore, immersion of this capacitor element in the conductive polymer compound dispersion together with drying was repeated twice so as to form a solid electrolyte layer containing the conductive polymer compound, sorbitol or sorbitol and polyalcohol in the capacitor element as shown in Table 1 and Table 2. After that, an electrolytic solution shown in Table 1 and Table 2 was filled in this capacitor element. Then, this capacitor element was inserted into a cylindrical exterior case having a bottom, sealing rubber was attached to an opening end and caulking was performed for sealing. After that, aging was applied by applying a voltage so as to form an electrolytic capacitor. Note that a rated voltage of this electrolytic capacitor was 35 WV. Moreover, an electrolytic capacitor of 63 WV was fabricated by changing the electrode foil and the aging condition of this electrolytic capacitor.

Test results of these electrolytic capacitors are shown in Table 1 and Table 2. The initial ESR characteristics, the ESR characteristics when a no-load shelf test at 125° C. for 1500 hours was conducted, and the ESR characteristics after the low-temperature charging/discharging test at −40° C. were evaluated by using a 35-WV product. Moreover, a withstand voltage rise rate before reflow and a withstand voltage drop rate after reflow were evaluated by using a 63-WV product. Note that the withstand voltage rise rate before reflow indicates a withstand voltage rise rate of electrolytic capacitors of each examples and comparative examples by fabricating an electrolytic capacitor (electrolytic capacitor for comparison) at 63 WV with a method similar to that of a comparative example 2 except that the electrolytic solution is not filled and by using a withstand voltage before reflow of the electrolytic capacitor for comparison as a basis. On the other hand, the withstand voltage drop rate after reflow indicates a drop rate of a withstand voltage caused by reflow by using a withstand voltage before reflow of the electrolytic capacitors of each example and the comparative example as a basis. Hereinafter, the withstand voltage rise rate before reflow and the withstand voltage drop rate after reflow below are values indicated by the similar method. Note that a peak temperature of reflow was assumed to be 260° C. Moreover, in this Specification, all the ESR characteristics are indicated by values at 100 kHz (20° C.)

TABLE 1

| | Solid electrolyte layer | | | Composition of electrolytic solution | | | | |
|---|---|---|---|---|---|---|---|---|
| | Content of sorbitol in solid electrolyte(wt %) | Sorbitol | Poly-alcohol | EG | GBL | TMS | BSa/A | TMA |
| Comparative example 1 | 80% | 80% | | | 40 | 60 | 7.44 | 1.56 |
| Comparative example 2 | 20% | 20% | | 60 | 40 | | 7.44 | 1.56 |
| Comparative example 3 | 40% | 40% | | 60 | 40 | | 7.44 | 1.56 |
| Example 1 | 60% | 60% | | 60 | 40 | | 7.44 | 1.56 |
| Example 2 | 80% | 80% | | 60 | 40 | | 7.44 | 1.56 |
| Example 3 | 92% | 92% | | 60 | 40 | | 7.44 | 1.56 |
| Comparative example 4 | 95% | 95% | | 60 | 40 | | 7.44 | 1.56 |

| | 35WV | | | 63WV Withstand voltage maintenance rate | |
|---|---|---|---|---|---|
| | ESR characteristics | | | Withstand voltage rise rate before reflow (%) | Withstand voltage drop rate after reflow (%) |
| | ESR (initial) [mΩ] | ESR@125° C. (1500 h) [mΩ] | ESR@-40° C. 100,000 cycles [mΩ] | | |
| Comparative example 1 | 33 | 62 | 43 | 5 | 1.2 |
| Comparative example 2 | 28 | 39 | 60 | 7 | 1.8 |
| Comparative example 3 | 26 | 34 | 33 | 10 | 0.8 |
| Example 1 | 18 | 28 | 32 | 15 | 0.4 |
| Example 2 | 16 | 25 | 29 | 20 | 0.3 |
| Example 3 | 17 | 26 | 50 | 23 | 0.2 |
| Comparative example 4 | 60 | 115 | 153 | 25 | 0.3 |

EG: Ethylene glycol
GBL: γ-butyrolactone
TMS: Sulfolane
BSalA: Borodisalicylic acid
TMA: Trimethylamine

TABLE 2

| | Solid electrolyte layer | | | Composition of electrolytic solution | | | | |
|---|---|---|---|---|---|---|---|---|
| | Content of sorbitol and polyalcohol in solid electrolyte (wt %) | Sorbitol | Poly-alcohol | EG | GBL | TMS | BSalA | TMA |
| Comparative example 5 | 40% | 20% | (EG) 20% | 60 | 40 | | 7.44 | 1.56 |
| Example 4 | 60% | 40% | (EG) 20% | 60 | 40 | | 7.44 | 1.56 |
| Example 5 | 80% | 60% | (EG) 20% | 60 | 40 | | 7.44 | 1.56 |
| Example 6 | 92% | 82% | (EG) 10% | 60 | 40 | | 7.44 | 1.56 |
| Comparative example 6 | 95% | 90% | (EG) 5% | 60 | 40 | | 7.44 | 1.56 |

TABLE 2-continued

| | 35 WV | | | 63 WV Withstand voltage maintenance rate | |
|---|---|---|---|---|---|
| | ESR characteristics | | | Withstand voltage rise rate before reflow (%) | Withstand voltage drop rate after reflow (%) |
| | ESR (initial) [mΩ] | ESR@125° C. (1500 h) [mΩ] | ESR@-40° C. 100,000 cycles [mΩ] | | |
| Comparative example 5 | 25 | 32 | 32 | 9 | 0.8 |
| Example 4 | 16 | 26 | 31 | 13 | 0.4 |
| Example 5 | 15 | 23 | 29 | 17 | 0.3 |
| Example 6 | 16 | 24 | 48 | 21 | 0.2 |
| Comparative example 6 | 55 | 111 | 151 | 25 | 0.3 |

EG: Ethylene glycol
GBL: γ-butyrolactone
TMS: Sulfolane
BSalA: Borodisalicylic acid
TMA: Trimethylamine From the result in Table 1, it was found that the electrolytic capacitors in the examples 1 to 3 containing a predetermined amount of sorbitol in the solid electrolyte and containing ethylene glycol in the electrolytic solution have initial ESR lower than those of the electrolytic capacitors in the comparative examples 1 to 4 and also have low ESR after a high-temperature test. It is known that the ESR characteristics after the charging/discharging test at a low temperature are largely deteriorated in the comparative example 4 with the content of sorbitol in the solid electrolyte at 95 wt %.

Moreover, the electrolytic capacitors in the examples 1 to 3 have the withstand voltage rise rates before reflow higher than those of the electrolytic capacitors in the comparative examples 1 to 3 and have the low withstand voltage drop rates after reflow, and it was found that the electrolytic capacitor of the present invention has high withstand voltage characteristics and that even though the reflow temperature was high, deterioration of the withstand voltage characteristics could be prevented.

From above, it was found that the electrolytic capacitor using the electrolytic solution making a content of sorbitol in the solid electrolyte at 60 to 92 wt % and containing ethylene glycol has low ESR characteristics and favorable withstand voltage characteristics.

Moreover, from the result in Table 2, it was found that the electrolytic capacitors in the examples 4 to 6 containing sorbitol and ethylene glycol in the solid electrolyte and containing ethylene glycol in the electrolytic solution have initial ESR lower than those of the electrolytic capacitors in the comparative examples 5 and 6 and also have low ESR after a high-temperature test. Moreover, it is known that the ESR characteristics after the charging/discharging test at a low temperature are largely deteriorated in the comparative example 6 with the content of sorbitol and ethylene glycol in the solid electrolyte at 95 wt %.

Moreover, the electrolytic capacitors in the examples 4 to 6 have the withstand voltage rise rates before reflow higher than those of the electrolytic capacitor in the comparative examples 5 and have the low withstand voltage drop rates after reflow. Therefore it was found that the electrolytic capacitor of the present invention has high withstand voltage characteristics and that even though the reflow temperature was high, deterioration of the withstand voltage characteristics could be prevented.

From above, it was known that the electrolytic capacitor using the electrolytic solution making a content of sorbitol and ethylene glycol in the solid electrolyte at 60 to 92 wt % and containing ethylene glycol has low ESR characteristics and favorable withstand voltage characteristics.

Subsequently, a type of polyalcohol contained in the solid electrolyte was changed, composition of an electrolytic solution containing ethylene glycol was changed, the initial ESR characteristics, the ESR characteristics after the no-load shelf test at 125° C. for 1500 hours was conducted, and the ESR characteristics after the low-temperature charging/discharging test at −40° C. were evaluated by using a 35-WV product, and the withstand voltage rise rate before reflow and the withstand voltage drop rate after reflow were evaluated by using a 63-WV product, and the results are shown in Table 3.

TABLE 3

| | Solid electrolyte layer | | | Composition of electrolytic solution | | | | | | | |
|---|---|---|---|---|---|---|---|---|---|---|---|
| | Content of sorbitol and polyalcohol in solid electrolyte (wt %) | Sorbitol | Poly-alcohol | EG | GBL | TMS | PhA | BSalA | AzA | TEA | TMA |
| Example 7 | 80% | 60% | (Glycerin) 20% | 60 | 40 | | | 7.44 | | | 1.6 |
| Example 8 | 80% | 60% | (Mannitol) 20% | 60 | 40 | | | 7.44 | | | 1.6 |
| Comparative example 2 | 20% | 20% | | 60 | 40 | | | 7.44 | | | 1.6 |
| Example 9 | 80% | 60% | (EG) 20% | 60 | 40 | | | 7.44 | | | 2.62 |

TABLE 3-continued

| | | | | | | | | |
|---|---|---|---|---|---|---|---|---|
| Comparative example 7 | 20% | 20% | | 60 | 40 | | 7.44 | 2.62 |
| Example 10 | 80% | 60% | (EG) 20% | 60 | 40 | 4 | | 2.44 |
| Comparative example 8 | 20% | 20% | | 60 | 40 | 4 | | 2.44 |
| Example 11 | 80% | 60% | (EG) 20% | 60 | 40 | | 4.5 | 2.42 |
| Comparative example 9 | 20% | 20% | | 60 | 40 | | 4.5 | 2.42 |

| | 35WV | | | 63WV Withstand voltage maintenance rate | |
|---|---|---|---|---|---|
| | ESR characteristics | | | Withstand | Withstand |
| | ESR (initial) [mΩ] | ESR@125° C. (1500 h) [mΩ] | ESR@-40° C. 100,000 cycles [mΩ] | voltage rise rate before reflow (%) | voltage drop rate after reflow (%) |
| Example 7 | 17 | 27 | 32 | 15 | 0.4 |
| Example 8 | 19 | 28 | 32 | 14 | 0.4 |
| Comparative example 2 | 28 | 39 | 60 | 7 | 1.8 |
| Example 9 | 18 | 24 | 39 | 17 | 0.2 |
| Comparative example 7 | 31 | 40 | 70 | 7 | 1.6 |
| Example 10 | 25 | 42 | 50 | 12 | 0.4 |
| Comparative example 8 | 38 | 62 | 102 | 5 | 2 |
| Example 11 | 26 | 43 | 55 | 14 | 0.3 |
| Comparative example 9 | 38 | 65 | 110 | 8 | 0.7 |

PhA: Phthalic acid
AzA: Azelaic acid
TEA: Triethylamine

The results in Table 3 show that the ESR characteristics and the withstand voltage characteristics are more favorable also in the electrolytic capacitors in the examples 7 and 8 using glycerin and mannitol as polyalcohol than the electrolytic capacitor in the comparative example 2. Moreover, the electrolytic capacitors in the examples 9 to 11 using borodisalicylic acid triethylamine, phthalic acid trimethylamine or azelaic acid triethylamine as a solute of the electrolyte showed more favorable results in the ESR characteristics and the withstand voltage characteristics than the electrolytic capacitors in the comparative examples 7 to 9.

Subsequently, the initial ESR characteristics for composition of an electrolytic solution when a content of ethylene glycol contained in the electrolytic solution was changed, the ESR characteristics after the no-load shelf test at 125° C. for 1500 hours was conducted, and the ESR characteristics after the low-temperature charging/discharging test at −40° C. were evaluated by using a 35-WV product, and the withstand voltage rise rate before reflow and the withstand voltage drop rate after reflow were evaluated by using a 63-WV product, and the results are shown in Table 4.

TABLE 4

| | Solid electrolyte layer | | | Composition of electrolytic solution | | | | |
|---|---|---|---|---|---|---|---|---|
| | Content of sorbitol and polyalcohol in solid electrolyte (wt %) | Sorbitol | Poly-alcohol | EG | GBL | TMS | BSalA | TMA |
| Example 12 | 80% | 60% | (EG) 20% | 5 | 40 | 55 | 7.44 | 1.56 |
| Example 13 | 80% | 60% | (EG) 20% | 10 | 40 | 50 | 7.44 | 1.56 |
| Example 14 | 80% | 60% | (EG) 20% | 20 | 40 | 40 | 7.44 | 1.56 |
| Example 15 | 80% | 60% | (EG) 20% | 40 | 40 | 20 | 7.44 | 1.56 |
| Example 16 | 80% | 60% | (EG) 20% | 60 | 40 | | 7.44 | 1.56 |
| Example 17 | 80% | 60% | (EG) 20% | 80 | 20 | | 7.44 | 1.56 |
| Example 18 | 80% | 60% | (EG) 20% | 100 | | | 7.44 | 1.56 |

TABLE 4-continued

| | 35WV | | | 63WV Withstand voltage maintenance rate | |
|---|---|---|---|---|---|
| | ESR characteristics | | | Withstand voltage rise rate before reflow (%) | Withstand voltage drop rate after reflow (%) |
| | ESR (initial) [mΩ] | ESR@125° C. (1500 h) [mΩ] | ESR@-40° C. 100,000 cycles [mΩ] | | |
| Example 12 | 25 | 51 | 35 | 10 | 1 |
| Example 13 | 20 | 47 | 36 | 12 | 0.4 |
| Example 14 | 17 | 44 | 38 | 15 | 0.4 |
| Example 15 | 16 | 40 | 39 | 17 | 0.4 |
| Example 16 | 14 | 28 | 30 | 18 | 0.3 |
| Example 17 | 14 | 27 | 57 | 20 | 0.3 |
| Example 18 | 14 | 27 | 65 | 20 | 0.2 |

The results in Table 4 show that by increasing the content of ethylene glycol, the initial ESR characteristic and the ESR characteristics at a high temperature were improved. Particularly, in the electrolytic capacitors in the examples 13 to 18 in which the ethylene glycol content in the solvent of the electrolytic solution is 10 wt % or more, results of the initial ESR characteristics and the ESR characteristics and the withstand voltage characteristics after the high-temperature test were more favorable than those in the example 12 in which the ethylene glycol content was 5 wt %.

Subsequently, the initial ESR characteristics for composition of an electrolytic solution when sorbitol was contained in the electrolytic solution and its content was changed, the ESR characteristics after the no-load shelf test at 125° C. for 1500 hours was conducted, and the ESR characteristics after the low-temperature charging/discharging test at −40° C. were evaluated by using a 35-WV product, and the withstand voltage rise rate before reflow and the withstand voltage drop rate after reflow were evaluated by using a 63-WV product, and the results are shown in Table 5.

TABLE 5

| | Solid electrolyte layer | | | | | | | | | |
|---|---|---|---|---|---|---|---|---|---|---|
| | Content of sorbitol and polyalcohol in solid electrolyte (wt %) | Sorbitol | Poly-alcohol | Composition of electrolytic solution | | | | | | |
| | | | | EG | GBL | TMS | PhA | BSalA | TEA | TMA | Sorbitol |
| Comparative example 10 | 20% | 20% | | 60 | 40 | | | 7.44 | | 1.56 | 12 |
| Example 19 | 80% | 60% | (EG) 20% | 60 | 40 | | | 7.44 | | 1.56 | 0.5 |
| Example 20 | 80% | 60% | (EG) 20% | 60 | 40 | | | 7.44 | | 1.56 | 1 |
| Example 21 | 80% | 60% | (EG) 20% | 60 | 40 | | | 7.44 | | 1.56 | 3 |
| Example 22 | 80% | 60% | (EG) 20% | 60 | 40 | | | 7.44 | | 1.56 | 5 |
| Example 23 | 80% | 60% | (EG) 20% | 60 | 40 | | | 7.44 | | 1.56 | 10 |
| Example 24 | 80% | 60% | (EG) 20% | 60 | 40 | | | 7.44 | | 1.56 | 12 |
| Example 25 | 80% | 80% | | 60 | 40 | | | 7.44 | | 1.56 | 5 |
| Example 26 | 80% | 60% | (EG) 20% | 40 | 40 | 20 | | 7.44 | | 1.56 | 5 |
| Example 27 | 80% | 60% | (EG) 20% | 60 | 40 | | 4 | | 2.44 | | 5 |

| | 35WV | | | 63WV Withstand voltage maintenance rate | |
|---|---|---|---|---|---|
| | ESR characteristics | | | Withstand voltage rise rate before reflow (%) | Withstand voltage drop rate after reflow (%) |
| | ESR (initial) [mΩ] | ESR@125° C. (1500 h) [mΩ] | ESR@-40° C. 100,000 cycles [mΩ] | | |
| Comparative example 10 | 39 | 65 | 53 | 5 | 1.2 |
| Example 19 | 15 | 33 | 38 | 18 | 0.4 |
| Example 20 | 16 | 30 | 33 | 18 | No drop |
| Example 21 | 16 | 30 | 32 | 19 | No drop |
| Example 22 | 18 | 29 | 36 | 19 | No drop |
| Example 23 | 19 | 31 | 71 | 20 | No drop |
| Example 24 | 23 | 35 | 107 | 20 | No drop |
| Example 25 | 24 | 29 | 36 | 20 | No drop |
| Example 26 | 23 | 48 | 65 | 13 | No drop |
| Example 27 | 28 | 39 | 49 | 12 | No drop |

The results in Table 5 show that, in the electrolytic capacitors in the examples 19 to 24 in which 60 wt %-sorbitol and polyalcohol were contained in the solid electrolyte and sorbitol was further contained in the electrolytic solution, the results of the initial ESR characteristics, the ESR characteristics at a high temperature and the withstand voltage characteristics were more favorable than the electrolytic capacitor in the comparative example 10 in which 20 wt %-sorbitol was contained in the solid electrolyte and sorbitol was further contained in the electrolytic solution. Particularly, it is known that by having the solid electrolyte contain predetermined amounts of sorbitol and polyalcohol and by having the electrolytic solution contain sorbitol, the withstand voltage drop rate after reflow was largely improved. It is known that the improvement effect of the withstand voltage drop rate after reflow was low in the electrolytic capacitor in the example 19 in which sorbitol was contained at 0.5 wt % with respect to the solvent of the electrolytic solution, and from the fact that the ESR characteristics after the low-temperature charging/discharging test at −40° C. was deteriorated in the electrolytic capacitor in the example 24 in which sorbitol was contained at 12 wt % with respect to the solvent of the electrolytic solution, the content of sorbitol with respect to the solvent of the electrolytic solution is preferably 1 to 10 wt %.

Moreover, in the electrolytic capacitors in the examples 25 to 27 in which a composition of sorbitol and polyalcohol in the solid electrolyte was changed, and composition of an electrolytic solution containing sorbitol was also changed, the results of the ESR characteristics and the withstand voltage characteristics were made favorable by having the solid electrolyte contain a predetermined amount of sorbitol and by having the electrolytic solution contain sorbitol, too.

What is claimed is:

1. An electrolytic capacitor comprising:
    a capacitor element including an anode electrode foil and a cathode electrode foil that are wound with a separator interposed therebetween;
    a solid electrolyte layer formed on the capacitor element and containing conductive polymer and sorbitol and polyalcohol, a content of sorbitol and polyalcohol contained in the solid electrolyte layer being 60 to 92 wt %; and
    an electrolytic solution containing ethylene glycol and filled in a gap portion in the capacitor element on which the solid electrolyte layer is formed,
    a content of ethylene glycol contained in the electrolytic solution being 10 wt % or more with respect to a solvent in the electrolytic solution.

2. The electrolytic capacitor according to claim 1, wherein the content of ethylene glycol contained in the electrolytic solution is 40 wt % or more with respect to the solvent in the electrolytic solution.

3. The electrolytic capacitor according to claim 2, wherein the polyalcohol is ethylene glycol.

4. The electrolytic capacitor according to claim 2, wherein the electrolytic solution contains γ-butyrolactone as the solvent and contains a solute selected from ammonium salt, quaternary ammonium salt, quaternized amidinium salt and amine salt of at least one type of organic acids, inorganic acids as well as composite compounds of organic acids and inorganic acids.

5. The electrolytic capacitor according to claim 2, wherein the solvent of the electrolytic solution includes at least one type of solvent selected from sulfolane, 3-methyl sulfolane and 2,4-dimethyl sulfolane.

6. The electrolytic capacitor according to claim 1, wherein the polyalcohol is ethylene glycol.

7. The electrolytic capacitor according to claim 6, wherein the electrolytic solution contains γ-butyrolactone as the solvent and contains a solute selected from ammonium salt, quaternary ammonium salt, quaternized amidinium salt and amine salt of at least one type of organic acids, inorganic acids as well as composite compounds of organic acids and inorganic acids.

8. The electrolytic capacitor according to claim 6, wherein the solvent of the electrolytic solution includes at least one type of solvent selected from sulfolane, 3-methyl sulfolane and 2,4-dimethyl sulfolane.

9. The electrolytic capacitor according to claim 1, wherein the electrolytic solution contains sorbitol.

10. The electrolytic capacitor according to claim 9, wherein
    a content of sorbitol contained in the electrolytic solution is 1 to 10 wt % with respect to the solvent in the electrolytic solution.

11. The electrolytic capacitor according to claim 1, wherein
    the electrolytic solution contains γ-butyrolactone as the solvent and contains a solute selected from ammonium salt, quaternary ammonium salt, quaternized amidinium salt and amine salt of at least one type of organic acids, inorganic acids as well as composite compounds of organic acids and inorganic acids.

12. The electrolytic capacitor according to claim 1, wherein
    the solvent of the electrolytic solution includes at least one type of solvent selected from sulfolane, 3-methyl sulfolane and 2,4-dimethyl sulfolane.

13. A method for manufacturing an electrolytic capacitor, including:
    an impregnation process impregnating a conductive polymer compound dispersion containing particles of a conductive polymer, sorbitol and polyalcohol and a solvent into a capacitor element including an anode electrode foil and a cathode electrode foil wound with a separator interposed therebetween;
    a solid electrolyte formation process forming a solid electrolyte layer in the capacitor element by drying the capacitor element after the impregnation process, a content of the sorbitol and polyalcohol contained in the solid electrolyte layer being 60 to 92 wt %; and
    an electrolytic solution filling process filling an electrolytic solution containing ethylene glycol in a gap portion in the capacitor element in which the solid electrolyte layer is formed,
    a content of ethylene glycol contained in the electrolytic solution being 10 wt % or more with respect to a solvent in the electrolytic solution.

14. A method for manufacturing an electrolytic capacitor according to claim 13, wherein
    the content of ethylene glycol contained in the electrolytic solution is 40 wt % or more with respect to a solvent in the electrolytic solution.

* * * * *